(12) United States Patent
Recksiek et al.

(10) Patent No.: US 8,746,625 B2
(45) Date of Patent: Jun. 10, 2014

(54) FLAP ADJUSTING SYSTEM OF AN AIRCRAFT WITH A REGULATING FLAP

(75) Inventors: Martin Recksiek, Hamburg (DE); Stefan Greif, Bremen (DE); Robert Schwinn, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/470,325

(22) Filed: May 13, 2012

(65) Prior Publication Data
US 2012/0312931 A1 Dec. 13, 2012

Related U.S. Application Data

(63) Continuation of application No. PCT/EP2010/006939, filed on Nov. 15, 2010.

(60) Provisional application No. 61/260,891, filed on Nov. 13, 2009.

(30) Foreign Application Priority Data

Nov. 13, 2009 (DE) .................. 10 2009 053 126

(51) Int. Cl.
*B64C 3/50* (2006.01)
(52) U.S. Cl.
USPC ........................................ 244/215; 244/99.9
(58) Field of Classification Search
USPC ............ 244/76 A, 99.2, 99.3, 99.9, 194, 203, 244/211, 212, 213, 214, 215; 73/802
See application file for complete search history.

(56) References Cited

U.S. PATENT DOCUMENTS

| | | | | |
|---|---|---|---|---|
| 2,809,736 A | * | 10/1957 | Hoover | 192/143 |
| 4,789,119 A | * | 12/1988 | Bellego et al. | 244/226 |
| 5,740,991 A | * | 4/1998 | Gleine et al. | 244/203 |
| 5,806,805 A | * | 9/1998 | Elbert et al. | 244/195 |
| 7,195,209 B2 | * | 3/2007 | Schievelbusch | 244/215 |

(Continued)

FOREIGN PATENT DOCUMENTS

DE 10 2007 063157 A1 7/2009
GB 2 425 099 A 10/2006

OTHER PUBLICATIONS

International Search Report for Application Serial No. WO 2011/057817 dated Aug. 11, 2011.

*Primary Examiner* — Tien Dinh
*Assistant Examiner* — Michael Kreiner
(74) *Attorney, Agent, or Firm* — Jenkins, Wilson, Taylor & Hunt, P.A.

(57) ABSTRACT

Embodiments pertain to a flap adjusting system including a regulating flap mounted on an airfoil using at least two bearing devices and movable relative to the airfoil, and an adjusting device. The adjusting device includes an actuator and adjusting kinematics with a drive rod that couples the actuator to the regulating flap using a first and a second joint, as well as a load sensor. The adjusting kinematics are configured such that, at a maximum adjustment travel of the regulating flap, the second joint between the drive rod and the regulating flap is adjusted by an angle less than 50% of the angle by which the first joint is adjusted. The load sensor is arranged in at least one adjusting device and in the second joint, which couples the drive rod to the regulating flap. The load sensor is configured to measure the forces in this load path.

15 Claims, 4 Drawing Sheets

(56) References Cited

U.S. PATENT DOCUMENTS

| | | | |
|---|---|---|---|
| 7,299,702 B2 * | 11/2007 | Gibert | 73/802 |
| 7,834,494 B2 * | 11/2010 | Blanding et al. | 310/68 B |
| 8,132,763 B2 * | 3/2012 | Schievelbusch | 244/215 |
| 8,136,418 B2 * | 3/2012 | Behar et al. | 74/89.23 |
| 8,230,750 B2 * | 7/2012 | Flatt et al. | 74/89.38 |
| 8,245,967 B2 * | 8/2012 | Kirkland | 244/76 R |
| 8,336,817 B2 * | 12/2012 | Flatt | 244/99.9 |
| 2010/0282899 A1 | 11/2010 | Heintjes | |
| 2012/0091282 A1 * | 4/2012 | Spiller | 244/213 |

* cited by examiner

FLAP ADJUSTING SYSTEM OF AN AIRCRAFT WITH A REGULATING FLAP

CROSS-REFERENCE TO RELATED APPLICATIONS

The present application is a continuation of International Application No. PCT/EP2010/006939, filed on Nov. 15, 2010, which claims priority from German Application DE 10 2009 053 126.2, filed on Nov. 13, 2009, and claims the benefit of U.S. Provisional application 61/260,890, filed on Nov. 13, 2009, each of which is hereby incorporated in its entirety by reference.

FIELD OF THE INVENTION

Various embodiments of the invention pertain to a flap adjusting system of an aircraft. The flap adjusting system includes at least one adjustable regulating flap on each airfoil, wherein the regulating flap may generally include an adjustable aerodynamic flap of an aircraft and, in particular, a high-lift flap. The flap adjusting system may include, in particular, a high-lift system of an aircraft.

BACKGROUND

Landing flap systems with a central drive and a central torsion shafting, by means of which adjusting devices for adjusting a flap are actuated, are known from the general state of the art. The shafting transmits the mechanical driving torque from a central driving motor to the actuators that move the flaps. If the adjusting devices are jammed, for example, it needs to be prevented that the driving torque is still transmitted to the regulating flap. It is known to utilize a load sensor in order to detect such instances.

US P 195 209 discloses a load sensor for drives of high-lift systems that measures the load at the output of an actuator and deactivates the drive system after an overload is detected.

DE 33 08 301 B3 discloses a high-lift system with a drive system, elements for transmitting the driving energy to drive units of individual segments of landing flap/slat systems and an overload protection that includes electric load sensors that are arranged at the points, at which the driving energy of the respective gear is introduced into the flap body, i.e., at the transfer point of the driving energy on the output lever of the gear.

SUMMARY

Various embodiments of the invention provide a flap adjusting system of an aircraft with a regulating flap and a load sensor for determining a load in an adjusting device of a regulating flap that allows a more reliable and more precise determination of the load values, as well as the most favorable integration of the load sensor possible with respect to maintenance expenditures.

Various embodiments of the invention provide a flap adjusting system of an aircraft with a regulating flap and a load sensor for determining a load in an adjusting device of a regulating flap that, in particular, also does not impair the accuracy of the load sensor during the exchange of components and, in particular, the actuator of the flap adjusting system and their adaptation to the structural circumstances in the flap adjusting system.

According to the various embodiments of the invention, a flap adjusting system or a servo system is proposed that includes:

at least one regulating flap that is respectively coupled to one of the airfoils of an aircraft by means of at least two bearing arrangements and movable relative to the airfoil, at least one adjusting device for adjusting the regulating flap, wherein each adjusting device includes: an actuator and adjusting kinematics for coupling the actuator to the regulating flap with a drive rod that couples the actuator to the regulating flap by means of a first and a second joint, as well as a load sensor, at least one drive unit for driving the adjusting devices, and a control and monitoring device that is functionally connected to the at least one drive unit in order to adjust the adjusting devices, as well as functionally connected to the at least one load sensor in order to receive the sensor signals generated by the load sensors.

According to various embodiments of the invention, the adjusting kinematics are configured in such a way that, at a maximum adjustment travel of the regulating flap, the second joint between the drive rod and the regulating flap is adjusted by an angle that amounts to less than 50% of the angle, by which the first joint is adjusted.

According to various embodiments of the invention, the load sensor is furthermore arranged in at least one of the at least one adjusting device that is respectively arranged on a regulating flap and in the second joint, by means of which the drive rod is coupled to the regulating flap, wherein the load sensor is configured in such a way that it measures the forces occurring in this load path.

The load sensor is integrated into the connecting bolt of the second joint for coupling the drive rod to the regulating flap and configured in such a way that it measures a lateral force that occurs in the connecting bolt and is exerted upon the second joint by the drive rod.

In comparison with solutions known from the state of the art, the solution purposefully limits the angular range, in which the load measurement needs to be carried out. The load measurement usually has a degree of accuracy that is greatest in a central region and drops in the regions to both sides thereof. In this case, it is decisive at which point the maximum effect is exerted upon the joint such as, e.g., the expansion in the joint or a joint sleeve thereof when the regulating flap is situated in a certain position such that a range, in which the maximum measurable effects are respectively exerted upon the joint, results for an adjusting range of the flap, in which the load measurement needs to be respectively carried out for system-related technical reasons. According to various embodiments of the invention, the load sensor is aligned or positioned in the joint such that the region of the joint, in which the greatest effect occurs due to the external load, is covered by the sensor in an optimal fashion in each adjusting range of the regulating flap that is relevant for the measurement. When utilizing a load sensor with a strain gauge, this means that the central section thereof that provides a greater measuring accuracy covers the region, in which the greatest expansions occur in the relevant adjustment positions of the regulating flap. According to various embodiments of the invention, it would also be possible to limit the adjusting range, in which the measurements are carried out, in the monitoring function of the control and monitoring device.

In this way, the load sensor can be positioned in the connecting bolt such that it covers the region, in which the greatest expansions occur in the connecting bolt in dependence on the possible angular positions of the joint in the different extending positions of the regulating flap, centrally or with its central section.

The adjusting kinematics may be configured, in particular, in such a way that, at a maximum adjustment travel of the flap, the second joint between the drive rod and the regulating flap is adjusted by an angular range that amounts to less than 50% of the angular range, in which the first joint is adjusted. In comparison with solutions known from the state of the art, the solution limits the angular range, in which the load measurement needs to be carried out. In this way, the load sensor can be positioned in the connecting bolt such that it covers the region, in which the greatest expansions occur in the connecting bolt in dependence on the possible angular positions of the joint in the different extending positions of the regulating flap, centrally or with its central section.

According to one example embodiment of the invention, it is proposed that the load sensor is arranged in a connecting bolt of the joint for coupling the drive rod to the regulating flap and configured in such a way that it measures a lateral force that occurs in the connecting bolt and is caused by the respective force exerted upon the regulating flap. The load sensor is arranged in the connecting bolt of the second joint for coupling the drive rod to the regulating flap and configured in such a way that it measures a lateral force that occurs in the connecting bolt and is exerted upon the second joint by the drive rod.

In this case, it would be possible, in particular, to arrange the load sensor in the connecting bolt of the joint for coupling the drive rod to the regulating flap and to configure the load sensor in the form of a strain gauge, namely such that it measures an expansion resulting from the force exerted upon the connecting bolt by the regulating flap on the surface of a connecting bolt or a joint housing accommodating the connecting bolt. In this case, the strain gauge can be applied onto the inner surface of a cavity of the connecting bolt or of the joint housing in such a way that it covers part of the circumference with respect to the joint axis, namely the region in which the greatest strains occur in the adjusting positions of the predetermined adjusting range of the regulating flap.

According to one example embodiment of the invention, the load sensor is composed of at least one strain measuring device that is arranged on the inner side of the connecting bolt. In this case, the connecting bolt may be configured in the form of a hollow bolt and the strain measuring device may be arranged on the surface of the inner bore. The strain measuring device may be composed of one or more strain gauges (DMS) that may be arranged, e.g., in the form of a full bridge arrangement. Alternatively, the load sensor may be configured in the form of a load cell. The load sensor may be generally configured in the form of a temperature-compensated arrangement of sensor components.

The solution is particularly advantageous in a flap adjustment system, in which the drive rod is adjustable with respect to its length in order to adjust the adjusting kinematics with respect to predetermined positions of the regulating flap, e.g., the position of the retracted regulating flap. In this case, it would be possible, in particular, to adjust the length of the drive rod by means of a thread.

In this example embodiment, the arrangement in the second joint is particularly advantageous in comparison with a solution, in which the sensor is arranged in the first joint: due to the dependence of the sensor accuracy on the direction of the force acting upon the sensor, a measuring error resulting from an adjustment of the drive kinematics and, in particular, a length change of the drive rod is reduced if the sensor is positioned on the second joint. The integration of a load sensor into the second joint proposed in accordance with various embodiments of the invention therefore is particularly advantageous in comparison with the solution of integrating the load sensor into the first joint known from the state of the art, namely because the adjustment of the adjusting kinematics results in much greater angular changes on the first joint between the drive lever and the drive rod than on the second joint. Only the arrangement of the load sensor in the second joint allows the detection of faults to be compensated in accordance with various embodiments of the invention with the reliability required for a safety-critical system, but threshold values that are sufficiently accurate in this respect—at all length adjustments of the drive lever—need to be defined for the load sensor in order to achieve this reliability.

According to another example embodiment of the invention, it is proposed that the load sensor of at least one adjusting device is connected to a control and monitoring device assigned to the adjusting device by means of a signal line in order to transmit the sensor signals generated by the load sensor, wherein said signal line extends from the load sensor into the regulating flap and from there into the main wing and to the control and monitoring device along one of the bearing arrangements. Although this measure can result in greater cable lengths than in the state of the art, the cable does not have to be routed via or through the actuator in this case such that the cable routing is easier to maintain, as well as more reliable. This cable routing furthermore makes it possible to better protect the cable from atmospheric influences.

In the design of the system, corresponding functions of the control and monitoring device make it possible to detect, among other things, the following safety-critical faults by means of the flap adjusting system according to various embodiments of the invention in an advantageous fashion, i.e., reliably, efficiently and without the necessity of structural reinforcement measures:

jamming in one of the adjusting devices or the flap or the bearing arrangement thereof, wherein such jamming can lead to an overload and therefore to a fracture of the drive train or adjacent structural components because the entire driving torque is applied at the corresponding station in case of jamming;

fracturing of a force-transmitting component of the adjusting device such as, e.g., a drive lever, wherein the fracture of a drive lever of a flap guided on two guideways can lead to tilting ("skew");

blocking of an adjusting device of a flap while driving energy continues to be transmitted through to the other adjusting device of the same flap, particularly due to a special internal fault of the actuator.

The reliability of detecting the aforementioned faults and, in particular, the second fault mentioned above increases with the accuracy of the load sensor on the output side of the actuator such that the arrangement of the actuator in the second joint in accordance with various embodiments of the invention is particularly advantageous in this respect.

It furthermore needs to be observed that this threshold value can have a significant spread due to manufacturing tolerances and temperature effects. The faulty station blocks or has a very high drag moment while the driving torque of the central drive shaft continues to be transmitted through to the other stations. Consequently, the flap continues to be moved by the actuator at the other station. This fault can lead to tilting ("skew") or twisting of the flap and may ultimately cause the flap to tear off.

Due to the utilization of the load measurement for the detection of an overload and/or underload, it is possible, in particular, to eliminate mechanical load limiters such that the component weights are reduced accordingly. The detection of an overload by means of load sensors is also more accurate because mechanical load limiters have a high manufacturing tolerance. Due to the higher accuracy in detecting an overload, structural components can be designed for a lower load. The structural weight is reduced due to this "snowball effect."

The flap adjusting system according to various embodiments of the invention makes it possible to detect a "skew" by determining the fundamental fault by means of a load measurement. This load measurement can be used for detecting other faults such that different faults can be detected with one monitoring mechanism. This reduces the overall sensor expenditures required for the detection of different faults and therefore increases the system reliability.

According to various embodiments of the invention, the control and monitoring device may be configured in such a way that it determines whether a limiting value or threshold value that characterizes an operating load is not reached based on the sensor signals received from the load sensor in order to thusly detect a fault on the flap. The limiting value or threshold value may also be defined in dependence on the flap position and/or the flying condition and/or the operating mode, with which the aircraft is flown, and/or the aircraft configuration (e.g., landing gear extended or retracted).

In this case, it would be possible, in particular, that the limiting or threshold value that characterizes an operating load amounts to less than half of the measured value for the maximum operating load.

Alternatively, it would also be possible to define a fixed limiting value that characterizes an operating load in the control and monitoring device.

It would furthermore be possible that the sensor value that is determined by the load sensor due to a load and needs to be compared with the limiting value that characterizes an operating load is a value that is determined based on the adjusting position of the respectively assigned regulating flap.

The flap adjusting system according to various embodiments of the invention may be configured with a "central drive," wherein the fault-tolerant flap adjusting system includes a drive unit that is controlled by the control and monitoring device and mechanically coupled to the adjusting devices of each wing by means of a rotary shaft in order to realize the actuation thereof.

In this case, the drive unit may includes at least one driving motor and at least one braking device that is assigned to the driving motor in order to stop the output of the respective driving motor, wherein the control and monitoring device includes:
   a servo function for generating command signals for the driving motors in order to adjust the regulating flap,
   a monitoring function, by means of which a command signal is sent to the braking device in order to actuate the braking device if the control and monitoring device detects a fault based on the comparison of a sensor value of the load sensor with a nominal value of one of the adjusting devices that are respectively assigned to the regulating flap.

Alternatively, the flap adjusting system according to various embodiments of the invention may be configured with a "central drive," wherein
   at least two adjusting devices are respectively connected to the at least one flap of each airfoil and spaced apart from one another in the wingspan direction of the flap, wherein the adjusting devices are coupled to the respective drive unit assigned to the regulating flap by means of one respective drive train, and
   the fault-tolerant flap adjusting system includes drive units for driving the adjusting devices, wherein one respective drive unit is assigned to each regulating flap and the drive units are functionally connected to a control and monitoring device that controls the drive units.

In this case, it would furthermore be possible
   that the adjusting devices of a regulating flap includes: at least one driving motor and at least one braking device that is assigned to the driving motor in order to stop the output of the respective driving motor, and
   that the control and monitoring device includes control and monitoring units, one of which respectively is functionally connected to the at least two adjusting devices that are respectively connected to a regulating flap, wherein each control and monitoring unit includes:
   a servo function for generating command signals for the driving motors in order to adjust the regulating flap,
   a monitoring function, by means of which a command signal is sent to the braking device in order to actuate the braking device if the control and monitoring device detects a fault based on the comparison of a sensor value of the load sensor with a nominal value of one of the adjusting devices that are respectively assigned to the regulating flap.

BRIEF DESCRIPTION OF THE DRAWINGS

Embodiments of the invention are described below with reference to the enclosed figures, in which.

DESCRIPTION

Figure 1:
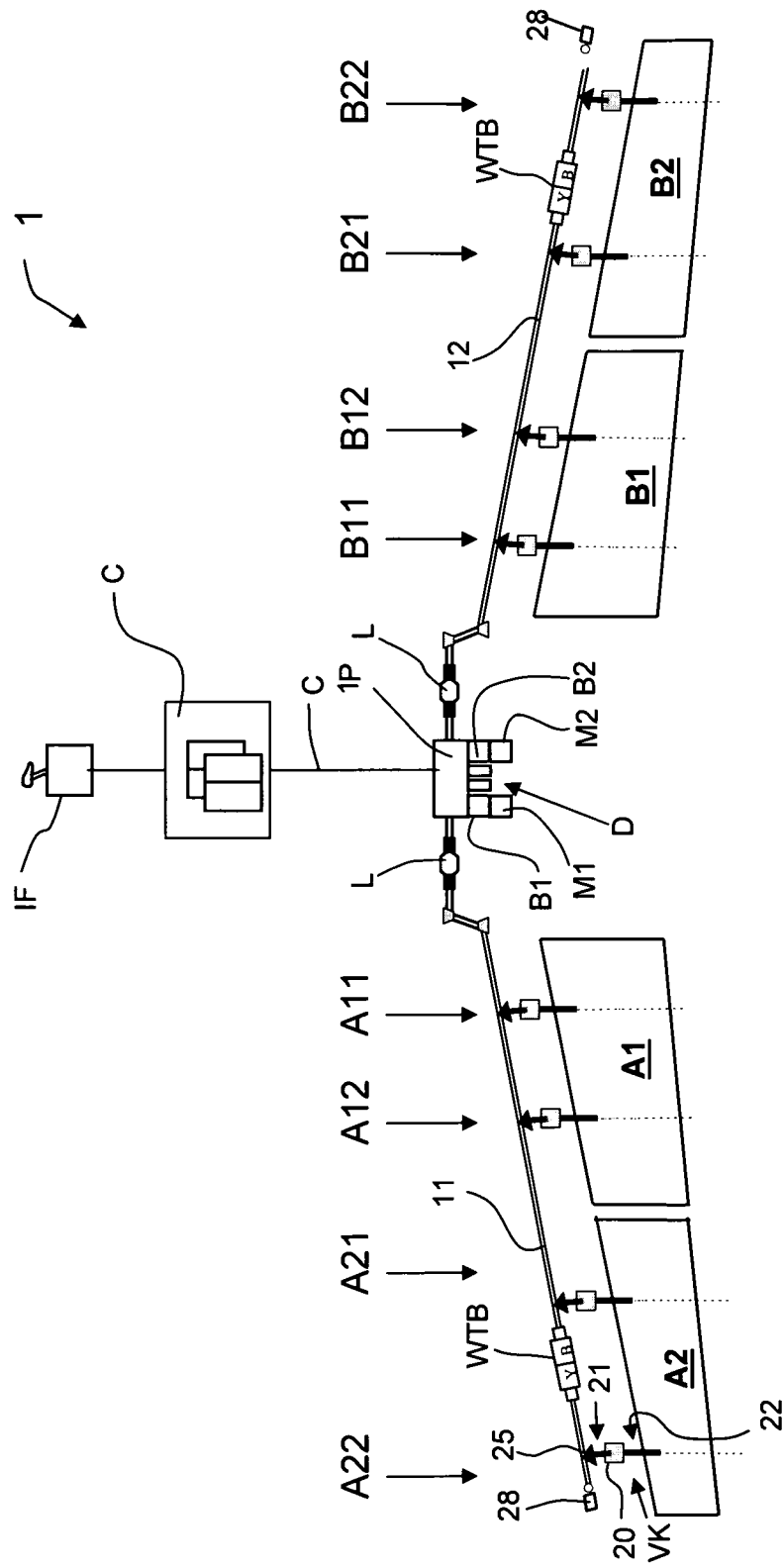
FIG. 1 shows a schematic representation of one embodiment of the inventive high-lift system with regulating flaps, two of which are provided for each wing, and with adjusting devices for actuating the regulating flaps, wherein the adjusting devices respectively include at least one actuator, at least one respective first load sensor positioned on the input side and one respective second load sensor positioned on the output side of the at least one actuator, and wherein the adjusting devices are driven by a central driving motor and a rotary shaft coupled thereto.

FIG. 1 shows an embodiment of the inventive flap adjustment system in the form of a high-lift system 1 for adjusting at least one regulating flap and, in particular, at least one landing flap on each airfoil. FIG. 1 shows two landing flaps on each airfoil that is not illustrated in FIG. 1. This figure specifically shows: an inner landing flap A1 and an outer landing flap A2 on a first airfoil and an inner landing flap B1 and an outer landing flap B2 on a second airfoil. In the high-lift system, it would also be possible to provide one or more than two landing flaps per airfoil.

Figure 3:
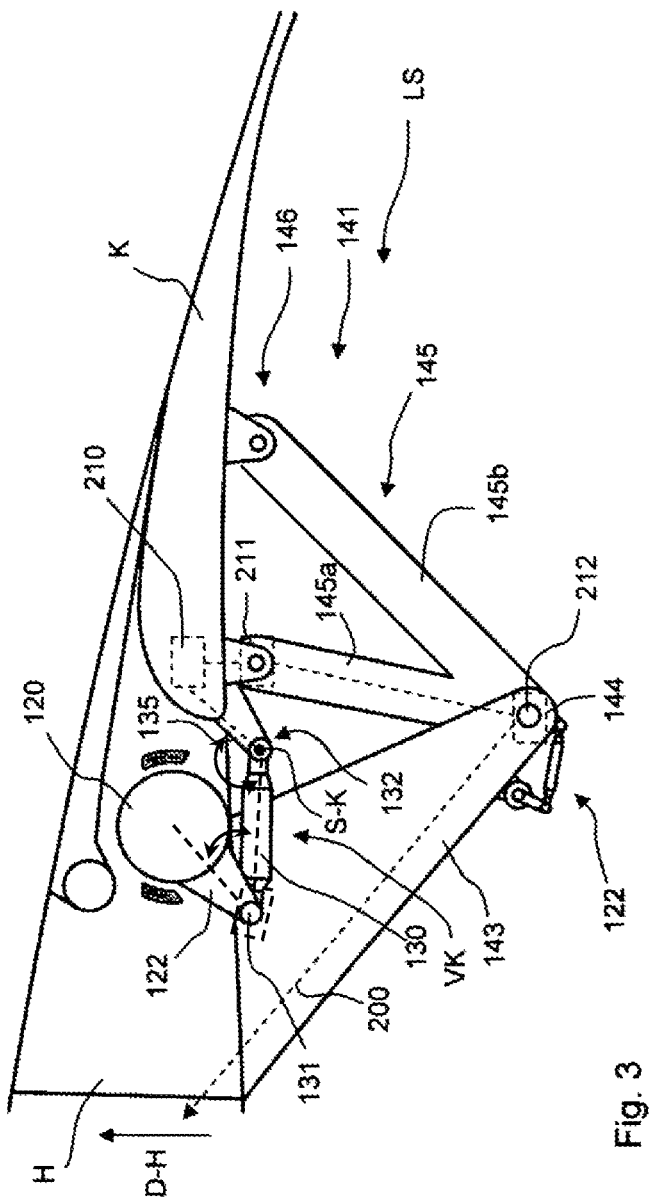
FIG. 3 shows a schematic representation of one embodiment of the adjusting device according to the invention with an illustration of the arrangement of the load sensor in the rotary joint that couples the push rod to the regulating flap.

The regulating flaps are movably mounted on the main wing of the airfoil, an embodiment of which is illustrated in FIG. 3, by means of one respective bearing station LS. Each regulating flap is furthermore coupled to an adjusting station with at least one adjusting device, wherein the adjusting station is configured in such a way that it can receive the power transmitted thereto by the drive unit and convert the received power into an adjusting motion of the flap mounted on the bearing station. In this context, the term adjusting station refers to the adjusting devices that are respectively connected to a regulating flap. If at least two adjusting devices are respectively assigned to a flap, they are spaced apart from one another in the wingspan direction of the flap.

The bearing station LS may be composed of one or more bearing devices that collectively supports or support the regulating flap on the main wing over the entire adjusting range. The at least one bearing device assigned to the flap may generally include "dropped-hinge kinematics" or "Fowler kinematics." "Fowler kinematics" may be realized, e.g., in the form of "track kinematics," "track-link kinematics" or "linkage kinematics." "Track kinematics" include a combination of a rail and a slide that can be moved on the rail. In order to adjust the regulating flap, an adjusting device is coupled to the slide such that the adjusting device correspondingly moves the slide on the rail ("track") and therefore the flap due to the actuation by the respectively assigned drive unit. In this case, the adjusting device may include a rotary actuator or a spindle drive that is coupled to the slide in order to realize the motion thereof. In so-called "dropped-hinge kinematics," the bearing device includes a joint brace that is arranged on the main wing in the region of its trailing edge and protrudes downward from this location. The flap is coupled to the outer end of the joint brace by means of a bracket arranged on the main wing. The adjusting device may, in particular, be coupled to the flap and include a rotary actuator in this case.

The high-lift system 1 is actuated and controlled by means of an interface that includes, in particular, a pilot interface IF and includes an actuating element such as, e.g., an actuating lever. The actuating element IF is functionally coupled to a control and monitoring device C that transmits control commands via a control line C1 in order to control a drive unit P. In the embodiment according to FIG. 1, the control and monitoring device C is configured in the form of a so-called "centralized" control and monitoring device C, i.e., it includes control and monitoring functions for several and, in particular, all adjusting devices A11, A12, B11, B12, A21, A22, B21, B22 of the high-lift system 1.

The centralized drive unit P that is arranged, e.g., in the fuselage region may be configured with one or more driving motors. In the embodiment of the high-lift system 1 shown, the drive unit P includes two driving motors M1, M2 that may include, e.g., a hydraulic motor and an electric drive. The drive unit P may furthermore include at least one braking device that is assigned to the driving motors M1, M2 and can be respectively actuated by means of a command signal of the control and monitoring device C. In the embodiment of the high-lift system illustrated in FIG. 1, the drive unit P includes two braking devices B1, B2 that can be respectively actuated by means of a command signal of the control and monitoring device C. The at least one braking device B1, B2 is functionally connected to the control and monitoring device C that actuates the braking device under predetermined conditions and thusly can block the rotary shaft drive trains 11, 12. If a defect occurs in the driving motor or one of several driving motors, the corresponding driving motor can be switched off by the central drive unit P or a driving motor control assigned to the at least one driving motor. If the drive unit P is composed of only one motor, the drive unit may also be configured with only one braking device. Such a motor may also be configured, in particular, in the form of a redundant motor, the driving function of which is configured redundantly in order to increase the reliability.

In the embodiment with two motors M1, M2 according to FIG. 1, the drive unit P may include a differential D that is coupled to the output sides of the hydraulic motor M1 and the electric motor M2 in such a way that the powers that are respectively generated by the hydraulic motor M1 and the electric motor M2 are added and transmitted to the rotary shaft drive trains configured, in particular, in the form of rotary drive shafts 11, 12. In the example embodiment of the inventive high-lift system illustrated in FIG. 1, two braking devices B1, B2 are furthermore provided and functionally connected to the control and monitoring device C. The control and monitoring device C is configured in such a way that it actuates the braking devices B1, B2 under predetermined conditions and, in particular, if it is determined that a critical fault has occurred on one of the components of the flap adjusting system such that the braking devices can block the rotary shafts 11, 12. If one of the two driving motors is switched off, e.g., the hydraulic motor M1 or the electric drive M2 in the example embodiment shown, the centralized drive unit P delivers a power that is reduced by the amount of the switched-off driving motor due to the differential that is designed in such a way that the respective powers generated by the hydraulic motor M1 and the electric motor M2 are added. It would also be possible to provide only one braking device instead of two braking devices B1, B2 and only one motor instead of two motors M1, M2.

In the example embodiment of the flap adjusting system shown, the drive unit P is provided for driving and adjusting all regulating flaps A1, A2, B1, B2 that form part of the flap adjustment system, i.e., at least one regulating flap per airfoil, but preferably several regulating flaps A1, A2 and B1, B2 per airfoil, by means of corresponding adjusting devices. Such a drive unit may be arranged, in particular, at a central location, i.e., particularly in the fuselage of the aircraft. A total of two drive trains, particularly in the form of the rotary drive shafts 11, 12, are respectively coupled to the drive unit P in order to actuate the at least one flap A1, A2 and B1, B2 per airfoil. The two rotary drive shafts 11, 12 are coupled to the centralized drive unit P and synchronized with one another by this drive unit. The central drive unit P sets the rotary drive shafts 11, 12 in rotation based on corresponding control commands in order to carry out adjusting motions of the adjusting devices A11, A12, B11, B12, A21, A22, B21, B22 of the respective regulating flap A1, A2 and B1, B2 that are connected to the rotary drive shafts. A load limiter or torque limiter L may be integrated into a shaft section of the rotary drive shafts 11, 12 that is positioned near the drive unit P.

At least one adjusting device A11, A12, B11, B12, A21, A22, B21, B22 is coupled to each flap A1, A2 and B1, B2 in order to realize the adjustment thereof. In the high-lift system 1 illustrated in FIG. 1, two adjusting devices A11, A12 or B11, B12 or A21, A22 or B21, B22 are respectively arranged on each regulating flap A1, A2, B1, B2, wherein the adjusting devices A11, A12 or B11, B12 are arranged on the inner regulating flaps A1 and B1 and the adjusting devices A21, A22 or B21, B22 are arranged on the outer flaps A2 and B2. All adjusting devices or generally at least one adjusting device that actuates or collectively actuate a flap can also be referred to as adjusting station.

Figure 2:
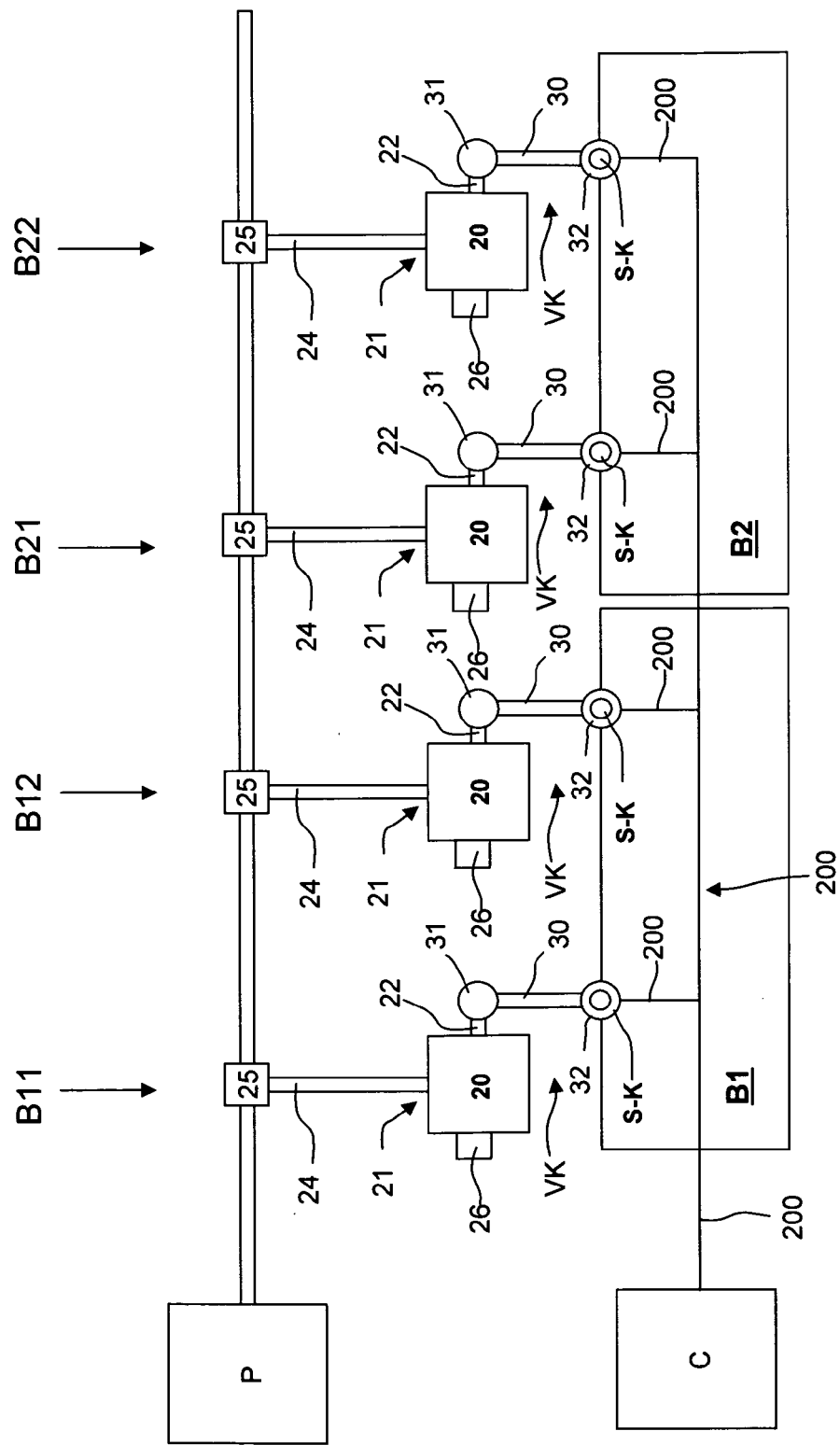
FIG. 2 shows an enlarged representation of the part of the high-lift system according to FIG. 1 that is intended for the right wing referred to the longitudinal axis of the aircraft.

The adjusting devices B11, B12, B21, B22 are described below with reference to FIG. 2 and the regulating flaps B1, B2, wherein the components of different adjusting devices B11, B12, B21, B22 that fulfill the same function are identified by the same reference symbol in each adjusting device B11, B12, B21, B22. This figure shows an embodiment of the flap adjusting system and, in particular, the high-lift system 1, in which each adjusting device B11, B12, B21, B22 includes a load sensor S-K on a joint 32.

Each of the adjusting devices B11, B12, B21, B22 (in the illustration according to FIG. 1, each of the adjusting devices A11, A12, B11, B12, A21, A22, B21, B22) includes an actuator 20 or a transmission gearing 20 and adjusting kinematics VK for kinematically coupling the actuator 20 to the regulating flap. The actuator 20 is generally coupled to the output of the drive unit. This can be realized by means of the transmission gearing 25. In the embodiment illustrated in FIG. 1, such a transmission gearing 25 is provided for converting the motion of the respective drive shaft 11, 12 into a motion of a driving component or driving element 21 that is coupled to the actuator 20 in order to transmit an input motion to an input element 21 or a so-called "downdrive link" on the input side of the actuator 20. The actuator or the transmission gearing 20 is mechanically coupled to the respective rotary drive shafts 11, 12 and converts a rotational motion of the respective rotary drive shafts 11, 12 into an adjusting motion of the flap region that is coupled to the respective adjusting devices B11, B12, B21, B22.

In this case, it would be possible to arrange a position sensor 26 (FIG. 2) on each adjusting device B11, B12, B21, B22 of a flap, wherein said position sensor determines the current position of the respective regulating flap A1, A2, B1, B2 and transmits this position value to the control and monitoring device C via a not-shown line.

In order to kinematically couple the actuator 20, the actuator 20 is generally coupled to the regulating flap A1, A2, B1, B2 by means of adjusting kinematics VK in the form of a coupling device on the flap side.

The actuator 20 generally also includes an output element or a driving element 22 that is coupled to the coupling device 30 on the flap side in order to couple the actuator to the respective regulating flap. Consequently, a motion of the output element 22 is transmitted in the form of a motion of the respective regulating flap A1, A2, B1, B2. In this case, a mechanical transmission gearing mechanism with a transmission gearing function may be provided between the input element 21 and the output element 22.

In addition, an asymmetry sensor 28 may be arranged on the ends of the rotary drive shafts 11 and 12, wherein said asymmetry sensor is also functionally connected to the control and monitoring device C by means of a not-shown line and transmits a current value to the control and monitoring device C via this line, and wherein this current value indicates whether the ends of the rotary drive shafts 11 and 12 are rotated within a predetermined range or whether the rotary drive shafts 11 and 12 are in asymmetric rotational positions.

Furthermore, a wing tip brake WTB may be respectively arranged on each rotary drive shaft 11 and 12 and block the rotary drive shaft or the respective drive train 11 or 12 when it is actuated. In this case, a wing tip brake WTB is arranged, in particular, at a location of the rotary drive shaft 11 and 12 that is positioned in an outer region of the respective wing. Each of the wing tip brakes WTB is also functionally connected to the control and monitoring device C by means of a not-shown line and can be controlled and actuated by the control and monitoring device C via this line. During the operation, the normal initial state of the wing tip brake WTB is a non-actuated state, in which the wing tip brakes do not intervene with the rotation of the rotary drive shafts 11 and 12. The wing tip brakes WTB can be actuated with a corresponding control signal of the control and monitoring device C in order to block the respectively assigned rotary drive shaft 11 or 12.

In an example embodiment of an adjusting device that is illustrated in FIG. 3, the actuator is configured in the form of a rotary actuator 120, the output element is configured in the form of an actuator lever 122 and the coupling device 130 is configured in the form of a drive rod or a connecting lever that couples the actuator to the regulating flap K by means of joints 131, 132. In this case, a first joint 131 that couples the drive rod 130 to the actuator lever 122 and a second joint 132 that couples the drive rod 132 to the regulating flap K are provided.

The regulating flap is coupled to the main wing H by means of a bearing station LS with at least one bearing device 141, wherein the bearing device in the example embodiment according to FIG. 3 is configured in the form of a bearing device 141 with dropped-hinge kinematics. The bearing device 141 includes a mounting brace 143 that extends on the main wing H and downward therefrom referred to the wing thickness direction D-H, wherein a bearing joint 144 is provided in said mounting brace. A supporting device in the form of a joint brace 145 is coupled to the bearing joint 144 and mounted or supported on a regulating flap K by means of a mounting device 146. The actuator is configured in the form of a rotary actuator 120.

In an alternative embodiment of the adjusting device in the form of track kinematics (not illustrated in figures), an actuator that may include, e.g., a rotary actuator or a spindle drive may be coupled to the slide, wherein a drive rod (analogous to the drive rod 130) is arranged on the slide by means of a first joint and on the regulating flap by means of a second joint.

According to various embodiments of the invention, at least one adjusting device (in FIG. 1, the adjusting devices A11, A12, B11, B12, A21, A22, B21, B22) on an airfoil or on a regulating flap A1, A2, B2, B2 includes a load sensor S-K that is arranged in the respective joint 32 or 132, by means of which the respective drive rod 30 or 130 is coupled to the respective regulating flap K or A1, A2; B1, B2, wherein the load sensor S-K is configured in such a way that it measures the forces occurring in this load path. The load sensor S-K is functionally connected to the control and monitoring device C in order to receive the sensor signals generated by the load sensors. The load sensor S-K is provided for measuring loads that are transmitted from the flap K to the adjusting kinematics VK due to external forces acting upon the flap K.

In this case, it would be possible, in particular, that the load sensor measures when a nominally permissible maximum load for the respective adjusting device A11, A12, B11, B12, A21, A22, B21, B22, in which the measurement is carried out, is reached or exceeded. The measurement of the maximum load can be carried out independently of an adjusting position of the regulating flap A1, A2, B1, B2 or K, i.e., in the entire adjusting range of the regulating flap A1, A2, B1, B2 or K, if the predetermined maximum load is defined in such a way that it generally represents a maximally permissible load. The measurement of the maximum load may be carried out continuously or within predetermined time intervals because the maximum load is defined independently of an adjusting position of the regulating flap A1, A2, B1, B2 or K. The determination of an assumed maximum load makes it possible, e.g., to detect a fracture or "disconnect" of one of the adjusting devices, namely because significantly higher loads that are greater than those occurring with intact adjusting devices occur on the at least one other adjusting device of the same regulating flap A1, A2, B1, B2 or K in this case. If the respective load occurring on the load sensor is measured continuously or within certain time intervals, the control and monitoring device C that receives the respectively measured sensor signals can compare these sensor signals with a signal value that corresponds to the predetermined maximum load and determine that a fault has occurred, as well as order and initiate suitable measures for reconfiguring the flap adjusting system or the adjusting station, if the maximum load of the adjusting station of the flap is exceeded. These measurements and associated comparisons of the measured values with the maximum load consequently can be carried out in any adjusting position of the regulating flap A1, A2, B1, B2 or K. Jamming and skewing or tilting of the flap K in an adjusting device ("skew") can be determined similarly by comparing the measured loads with an assumed maximum load: in this case, greater loads than in instances, in which no such jamming takes place, occur on the other respective adjusting device of the same flap if an adjusting command was previously and/or subsequently issued by the control and monitoring device C. In this case, significantly higher forces are generated on the still intact adjusting device of the same regulating flap A1, A2, B1, B2 or K in a respective second joint 32 or 132 because not only the air loads, but also the forces exerted by the adjusting device act upon the respective second joint 32 or 132 such that the control and monitoring device C determines that the predetermined maximum load is exceeded based on the signal values that are measured by the load sensor S-K arranged in the same joint for the respectively occurring load, as well as a corresponding comparison. The control and monitoring device C may be configured in such a way that it determines a fault in the respective adjusting station that belongs to the regulating flap A1, A2, B1, B2 or K in question and comprises the adjusting devices A11, A12 or B11, B12 or A21, A22 or B21, B22 that are respectively assigned to a regulating flap A1, A2, B1, B2 or K and, if applicable, orders and initiates suitable measures for reconfiguring the flap adjusting system or the adjusting station.

If a load sensor S-K indicates a load-free state while the other load sensor S-K connected to the other drive station of the same regulating flap A1, A2, B1, B2 or K indicates an increased load, it can be assumed that a fracture of the actuator coupling to the regulating flap A1, A2, B1, B2 or K has occurred and a corresponding fault may thusly be defined. In this case, the control and monitoring device C may also be configured in such a way that it generates a command signal for the braking devices in order to immediately stop the flap adjustment system.

If an adjusting device of a regulating flap A1, A2, B1, B2 or K is blocked while driving energy continues to be transmitted through to another adjusting device of the same flap, an increased load occurs on the defective adjusting device A11, A12, B11, B12, A21, A22, B21, B22 due to the tilting of the regulating flap A1, A2, B1, B2 or K that occurs this case, wherein said increased load is detected based on a corresponding comparison of the values determined by the load sensor S-K arranged at this location with nominal values and also results in the immediate deactivation and stop of the flap adjusting system by the control and monitoring device C due to the generation of a corresponding command signal.

As soon as the load sensor S-K detects a load that lies above a defined threshold value, an overload is detected and the respective control and monitoring device C may be configured in such a way that the flap adjusting system or the adjusting station is stopped. The threshold value may either be a fixed, predetermined value or a value that is dependent on other state variables. If only a fixed value is used, the overload detection corresponds to the function of modern load limiters, however, on electronic basis. The utilization of state-dependent threshold values allows an earlier fault detection in many fault scenarios.

It would alternatively or additionally be possible that the load sensor S-K measures when an operating load that is predetermined on the basis of assumptions is not reached and/or exceeded. Since the load sensors S-K are situated at the interface between the system and structure, it would also be possible, according to various embodiments of the invention, to determine the structural loads with the load sensors. If the load profiles are continuously recorded in the central computer, they can be evaluated with respect to the structural load cycles. This information can be used for "duty cycle" monitoring and/or "health monitoring."

The control and monitoring device C may be configured in such a way that it concludes and identifies a "disconnect" on the same adjusting device if the actually determined load does not reach a predefined or determined operating load based on a comparison of signal values for the respectively occurring load with values for an assumed operating mode, namely because the external forces occurring on the flap cannot be transmitted to the adjusting kinematics VK of the same adjusting device A11, A12, B11, B12, A21, A22, B21, B22 via the connecting device in this case. In such instances, the control and monitoring device C determines that a fault has occurred in the respective adjusting device A11, A12, B11, B12, A21, A22, B21, B22 or adjusting station and, if applicable, orders suitable measures for reconfiguring the flap adjusting system or the adjusting station such as, e.g., stopping the flap adjusting system or high-lift system 1 by means of the braking devices B1, B2.

In this case, the nominal value or comparison value used may be dependent on the adjusting position, wherein the respective comparison values or the predefined operating load are/is determined in tests for each adjusting position and stored in the control and monitoring device C. Consequently, the measurement can be carried out continuously during the operation of the aircraft, i.e., particularly within regular time intervals and in dependence on the state of adjustment of the adjusting devices of a regulating flap A1, A2, B1, B2 or K. It would also be possible to carry out the load measurement when an adjustment of the adjusting device A11, A12, B11, B12, A21, A22, B21, B22 or the regulating flap A1, A2, B1, B2 or K is ordered and carried out. If the load measurement is carried out continuously or regularly, the control and monitoring device C determines a comparison value during the adjustment of the regulating flap A1, A2, B1, B2 or K, wherein this comparison value cannot be exceeded or must be reached—depending on the type of comparison value, i.e., depending on whether this is a maximum value or an operating load value, and wherein a corresponding comparison value that depends on the respectively assumed adjusting position of the regulating flap A1, A2, B1, B2 or K is used for the comparison. For example, if the landing flap is extended prior to the landing approach, the control and monitoring device C can carry out a measurement of the load by means of the load sensor, determine based on the comparison whether a maximum load has been exceeded or an operating load has not been reached and determine that a fault has occurred in the adjusting device in question in the respective instance. The control and monitoring device C may subsequently or simultaneously carry out a reconfiguration of the flap adjusting system and block the flap adjusting system 1 during this process by means of the at least one braking device and/or specify a modified approach mode, in which the respectively determined fault does not affect the landing approach.

It would be possible, in particular, to realize a function in the control and monitoring device C, by means of which the adjusting devices of a regulating flap are moved into a predetermined adjusting position and the load measurements are subsequently carried out with the aid of the at least one load sensor on the adjusting devices of the regulating flap in order to determine, if applicable, a fault thereof and to initiate a reconfiguration of the flap adjustment system. The measurement can also be carried out when the regulating flap is retracted.

In a high-lift system 1, in which the respective actuators 20 and 120 of the adjusting devices A11, A12, B11, B12, A21, A22, B21, B22 are controlled by a decentralized control and monitoring device C via electric lines and in which at least two respective actuators 20 and 120 are connected to a regulating flap in order to realize the actuation thereof, the system could be configured such that the respective regulating flap A11, A12, B11, B12, A21, A22, B21, B22 is no longer actuated once the adjusting device fault detection function determines that the respective adjusting device A11, A12, B11, B12, A21, A22, B21, B22 is malfunctioning (fault A). In order to avoid control asymmetries, it would furthermore be possible that the regulating flap arranged symmetric to the faulty regulating flap referred to the longitudinal axis of the aircraft also is no longer actuated. In addition, it would be possible to actuate a brake B1, B2 provided in the respective actuator 20 and 120 for such instances in order to lock the regulating flap A11, A12, B11, B12, A21, A22, B21, B22 in its current state of adjustment.

If the actuators are driven by a common rotary drive shaft 11, 12 and the respective components of the adjusting kinematics VK are equipped with a failsafe mechanism, the high-lift system reconfiguration function may specify the continued actuation of the adjusting device A11, A12, B11, B12, A21, A22, B21, B22 in question.

In such a high-lift system, in which actuators of the adjusting devices A11, A12, B11, B12, A21, A22, B21, B22 are controlled by a centralized control and monitoring device C via electric lines, the same optional measures as in the case of fault A can be initiated if it is determined that fault B has occurred. In a high-lift system 1 according to FIG. 1, in which the adjusting devices A11, A12, B11, B12, A21, A22, B21, B22 are mechanically driven by means of rotary drive shafts 11, 12, it would be possible to block the system by means of the motor brakes M1, M2 and/or the wing tip brake WTB if it is determined that fault B has occurred in an adjusting device in order to avoid system-internal conflicts of forces.

In a high-lift system 1 that is driven in a centralized fashion, i.e., by means of rotary shafts 11, 12, it would be possible for the control and monitoring device C or the high-lift system reconfiguration function to send an actuating signal to a wing tip brake WTB, as well as to the at least one braking device B1, B2, in order to block both shaftings 11, 12 if the nominal positions determined by the control and monitoring device C impermissibly deviate from the actual positions measured by means of the position sensors 26.

In the example embodiment illustrated in FIG. 3, the actuator lever 131 of the rotary actuator 120 is coupled to the drive rod 130 by means of a first joint 131 and the drive rod is in turn coupled to a connecting device 135 of the regulating flap K by means of a second joint 132.

Due to the arrangement of the load sensor S-K in the respective joint 32 or 132 that connects the drive rod to the regulating flap A1, A2, B1, B2 or K, the load sensor S-K measures a load that acts upon the respective joint 32 or 132. The load sensor S-K is preferably arranged in a connecting bolt of the joint for coupling the respective drive rod 30 or 130 to the regulating flap A1, A2, B1, B2 or K and configured in such a way that it measures a lateral force in the bolt that is caused by the respective force exerted by the regulating flap A1, A2, B1, B2 or K.

According to one example embodiment, the load sensor S-K is composed of at least one strain measuring device that is arranged on the inner side of the connecting bolt configured in the form of a hollow bolt. In this case, the internally arranged strain gauges (DMS) may be arranged in the hollow bolt in the form of a full bridge arrangement. The load sensor S-K may generally include a load cell. The load sensor S-K may furthermore be configured in the form of a temperature-compensated arrangement of sensor components.

Adjusting kinematics VK of the adjusting devices A11, A12, B11, B12, A21, A22, B21, B22 of a regulating flap A1, A2, B1, B2 or K in the form of dropped-hinge kinematics or track kinematics with a rotary actuator 20, 120 may be configured, in particular, in such a way that the respective second joint 32 or 132 between the respective drive rod 30 or 130 and the regulating flap A1, A2, B1, B2 or K is adjusted by an angular range that amounts to less than 30% and preferably less than 50% of the angular range, by which the respective first joint 31 or 131 is adjusted, when the flap carries out the maximum adjustment travel. This means that the angle between the respective drive rod 30 or 130 and the regulating flap A1, A2, B1, B2 or K changes by an amount that corresponds to less than 30% and preferably less than 50% of the angular change occurring between the respective drive rod 30 or 130 and the respective actuator lever 22 or 122 at a maximum adjustment travel of the flap.

In comparison with the arrangement of the load sensor S-K in the respective first joint 31 or 131, the arrangement of the load sensor S-K in the respective joint 32 or 132 that connects the respective drive rod 30 or 130 and the regulating flap A1, A2, B1, B2 or K provides the particular advantage that the load sensor S-K only has to cover a smaller range of the rotational angle in the respective second joint 32 or 132 and that the region of greater accuracy of the load sensor S-K covers a greater adjusting range of the regulating flap A1, A2, B1, B2 or K. In this respect, it needs to be taken into account that a load sensor S-K, particularly in the form of a strain gauge, usually has a greater measuring accuracy in a central region of its longitudinal direction and that the measuring accuracy drops from there toward the edge regions.

According to various embodiments of the invention, it is therefore possible, in particular, to position the load sensor S-K or the strain gauge in such a way that the central region or the measuring region of the load sensor S-K with the greatest accuracy covers a region of the connecting bolt of the respective second joint 32 or 132, in which the maximum tensions or strains are expected when the regulating flap A1, A2, B1, B2 or K assumes an adjusting position or a range of adjusting positions, in which a load measurement needs to be respectively carried out.

The load sensor S-K is provided for measuring loads that are transmitted from the regulating flap A1, A2, B1, B2 or K to the adjusting kinematics VK due to external forces acting upon the regulating flap A1, A2, B1, B2 or K. In this case, the load sensor S-K measure, in particular, when a maximum load is reached or exceeded. The load sensor S-K may alternatively or additionally measure when an operating load is not reached and/or exceeded. This occurs, in particular, during a "disconnect" of adjusting kinematics VK. In this respect, it is proposed, according to various embodiments of the invention, that the load sensor S-K is positioned in the joint in such a way that the relevant adjusting range of the regulating flap A1, A2, B1, B2 or K is optimally covered.

According to one example embodiment of the flap adjusting system or high-lift system 1, the sensors are directly connected to a "centralized" control and monitoring device C that preferably is arranged centrally in the aircraft fuselage, wherein the signals of the load sensors S-K are transmitted to the central control and monitoring device C for evaluation purposes, and wherein the comparison function for comparing the sensor signals measured by the load sensors S-K with nominal values, as well as the evaluation and the determination of a fault in an adjusting device if the compared values deviate accordingly, are implemented in the central control and monitoring device (FIG. 1). A reconfiguration function that generates commands for reconfiguring the flap adjusting system 1 or the flight guidance device of the aircraft based on the determination of a fault in an adjusting device may furthermore be implemented in the central control and monitoring device C. Such a command may include, e.g., a command for activating the braking devices B1, B2, WTB of the flap adjusting system and/or the specification of a safety mode or back-up mode in the flight guidance device of the aircraft such as, e.g., a landing mode that is modified in comparison with the normal landing mode and in which the regulating flaps A1, A2, B1, B2 or K that are still considered to be controllable in an intact fashion are moved into a favorable position for the landing with respect to the determined fault and/or a correspondingly determined adjusting position of the regulating flap A1, A2, B1, B2 or K, to which the adjusting device A11, A12, B11, B12, A21, A22, B21, B22 of the high-lift system 1 that was determined to be faulty is coupled.

Figure 4:
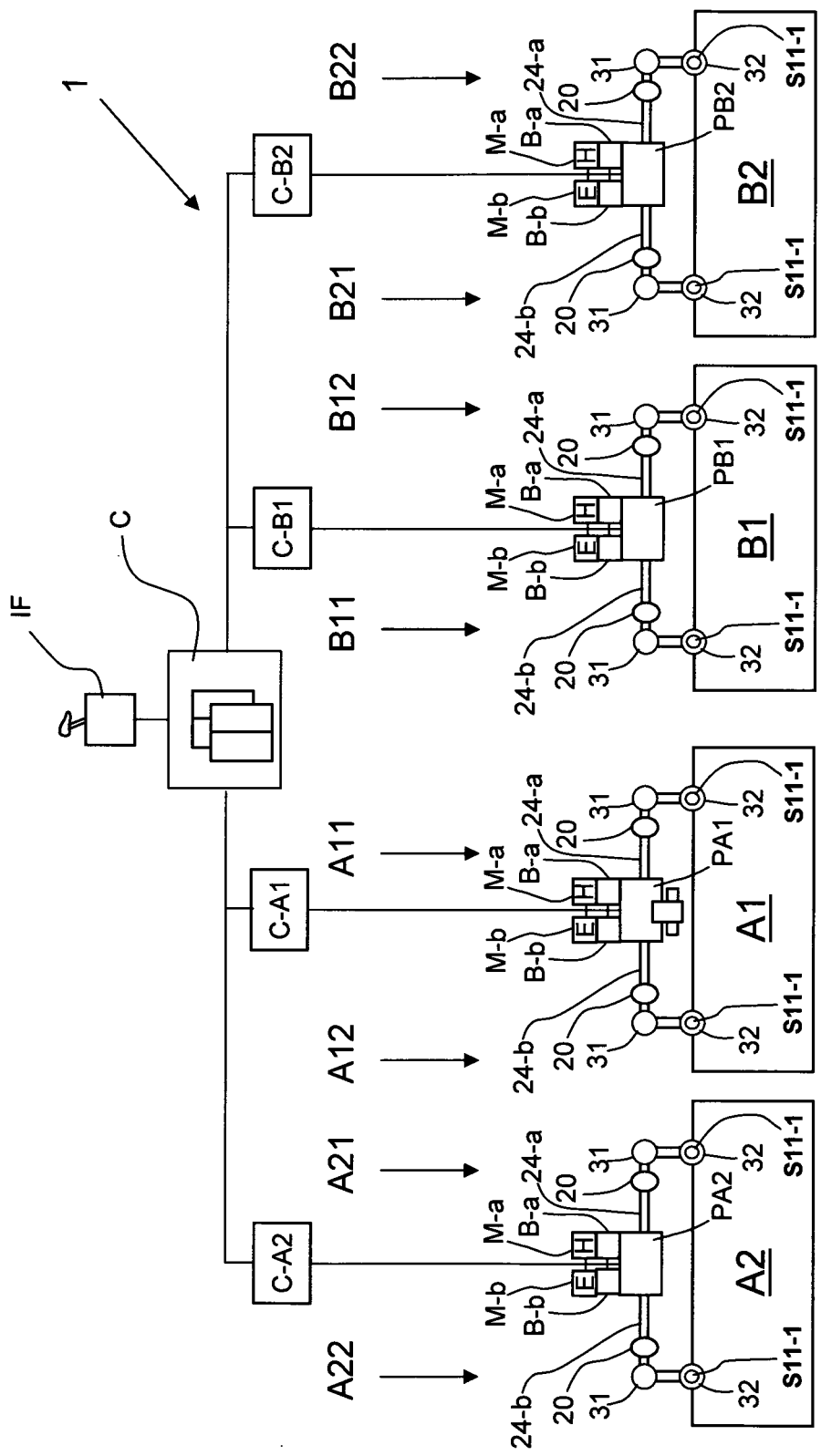
FIG. 4 shows a schematic representation of an embodiment of the inventive high-lift system that represents an alternative to the embodiment illustrated in FIG. 1 and includes regulating flaps, the adjusting devices of which are actuated by means of one respective drive unit, wherein components of the high-lift system according to FIG. 2 have a function similar to that of the components that are in part identified by the same reference symbols as in FIG. 1.

According to the example embodiment illustrated in FIG. 4, it would be possible to provide decentralized or local control and monitoring devices C-A1, C-A2, C-B1, C-B2 that are preferably arranged in the main wing, as well as respectively assigned and locally arranged in the wingspan direction of the main wing in the spatial vicinity of the adjusting devices A11, A12, B11, B12, A21, A22, B21, B22 of the same regulating flap A1, A2, B1, B2 or K that the local control and monitoring device C respectively controls. In this case, each local control and monitoring device C-A1, C-A2, C-B1, C-B2 may include a fault detection function and reconfiguration function with respect to the respectively assigned adjusting devices A11, A12, B11, B12, A21, A22, B21, B22. In a thusly configured arrangement, a centralized control and monitoring device C is also provided in order to determine and specify nominal adjusting positions for each of the local control and monitoring devices C-A1, C-A2, C-B1, C-B2. The determination of a fault in an adjusting device or the adjusting devices A11, A12, B11, B12, A21, A22, B21, B22 of a regulating flap A1, A2, B1, B2 or K is transmitted to the centralized control and monitoring device C by the local control and monitoring devices C-A1, C-A2, C-B1, C-B2 if a fault is respectively detected therein or sensor value deviations have occurred.

In the embodiment according to FIG. 4, one drive unit PA1, PA2, PB1, PB2 is respectively provided for each regulating flap A1, A2, B1, B2, wherein each drive unit may include at least one motor and a braking device. In the embodiment shown, each drive unit PA1, PA2, PB1, PB2 includes two motors M-a, M-b and a transmission that is coupled to the output sides of the first braking device M-a configured in the form of a hydraulic motor (reference symbol H) and of the second braking device M-b configured in the form of an electric motor M2 (reference symbol E) in such a way that the respective powers generated by the hydraulic motor H and the electric motor E are added and transmitted to the rotary drive shafts 24-a, 24-b. The at least one braking device is functionally connected to the respectively assigned decentralized control and monitoring device C-A1, C-A2, C-B1, C-B2. The control and monitoring devices C-A1, C-A2, C-B1, C-B2 are configured in such a way that they actuate the at least one braking device B-a, B-b under predetermined conditions and, in particular, if it is determined that a critical fault has occurred in one of the components of the flap adjusting system in order to block the rotary shaft drive trains 24-a, 24-b. The drive units PA1, PA2, PB1, PB2 are configured in such a way that the malfunction of one of the two driving motors such as, e.g., the hydraulic motor H or the electric motor E in the example embodiment shown can be compensated with the effect that the output power of the transmission is cut in half.

In this case, the respectively assigned drive unit PA1, PA2, PB1, PB2 delivers a power that is reduced by the amount of the switched-off driving motor due to the differential that is designed such that the respective powers generated by the hydraulic motor H and the electric motor are added.

The positioning of the load sensor S-K in the respective second joint 32 or 132 makes it possible to route a cable for functionally connecting the load sensor S-K to the respectively assigned control and monitoring device C, C-A1, C-A2, C-B1, C-B2 to the respectively assigned control and monitoring device C, C-A1, C-A2, C-B1, C-B2 in the main wing via the respective regulating flap K and at least one of the bearing devices 141 of this regulating flap K. This embodiment of the cable routing may be realized in a bearing device with "track kinematics," as well as in a bearing device with "dropped-hinge kinematics." In this way, the cable routing via the actuator is avoided and can be realized with relatively simple plug connectors between cable sections.

This cable routing is schematically illustrated in FIG. 3 with reference to a bearing device 141 with "dropped-hinge kinematics." The cable 200 extends along the connecting device 135 and from there into the interior of the regulating flap K through an opening. Alternatively, the cable 200 may also be routed from the joint 132 into an interior space of a connecting device 135 and then into the regulating flap K. A collection point 210 may be provided within the regulating flap K, wherein the cable 200 arriving from the load sensor S-K is combined with one or more other cables at this collection point, in particular, in order to connect the sensors to the respective control and monitoring device as illustrated in FIG. 2. From there, the cable 200 is routed via at least one joint brace 145, 145a, 145b to the bearing joint 212, to which the joint brace is coupled on the mounting brace 143. In this case, the cable 200 may include a plug connection 211 for connecting two cable sections of the cable 200 on the structural mounting or coupling of the joint brace 145 or one joint brace 145a, 145b thereof in order to realize the regulating flap K such that it can be detached from the joint brace and therefore from its bearing device. The cable 200 then extends past the joint 144 and into the interior of the main wing H along the mounting brace 143. A plug connection between two cable sections may be once again provided on the joint 144. The joint brace 145, 145a, 145b and the mounting brace 143 may include a cavity with a device for guiding the cable and the cable 200 may extend in the interior of the joint brace 145, 145a, 145b and in the interior of the mounting brace 143. The cavity may be configured, in particular, in the form of an empty tube that is arranged on the outer side of the joint brace 145, 145a, 145b and/or of the mounting brace 143, installed into the joint brace 145, 145a, 145b and/or the mounting brace 143 or structurally integrated into the joint brace 145, 145a, 145b and/or the mounting brace 143.

In a flap adjusting system with local control and monitoring devices C-A1, C-A2, C-B1, C-B2, the cable 200 is routed to the control and monitoring devices C-A1, C-A2, C-B1, C-B2 that are respectively assigned to the flap K in question.

In a flap adjusting system with a centralized control and monitoring device C, the cable 200 is routed to the same control and monitoring device C.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A flap adjusting system of an aircraft, comprising:
    at least one regulating flap respectively coupled to one of a plurality of airfoils of the aircraft by at least two bearing devices and movable relative to the plurality of airfoils;
    at least one adjusting device for adjusting the at least one regulating flap, wherein each of the at least one adjusting device comprises:
        an actuator, and adjusting kinematics for kinematically coupling the actuator to the at least one regulating flap with a drive rod that couples the actuator to the at least one regulating flap by a first and a second joint, wherein the drive rod is coupled to the at least one regulating flap by the second joint, and wherein at least one load sensor is arranged on the at least one adjusting device that is respectively arranged on the at least one regulating flap and is configured for measuring forces occurring in a load path;
    at least one drive unit for driving the at least one adjusting device; and
    a control and monitoring device that is functionally connected to the at least one drive unit in order to adjust the at least one adjusting device, as well as functionally connected to the at least one load sensor in order to receive sensor signals generated by the at least one load sensor, wherein
    the adjusting kinematics are configured in such a way that, at a maximum adjustment travel of the at least one regulating flap, the second joint between the drive rod and the at least one regulating flap is adjusted by an angle that amounts to less than 50% of an angle by which the first joint is adjusted.

2. The flap adjusting system of an aircraft according to claim 1, wherein the at least one load sensor is integrated into a connecting bolt of the second joint for coupling the drive rod to the at least one regulating flap and configured in such a way that the at least one load sensor measures a lateral force that occurs in the connecting bolt and is exerted upon the second joint by the drive rod.

3. The flap adjusting system of an aircraft according to claim 1, wherein the at least one load sensor comprises at least one strain measuring device that is arranged on an inner side of the connecting bolt.

4. The flap adjusting system of an aircraft according to claim 1, wherein the drive rod is adjustable with respect to its length in order to adjust the adjusting kinematics.

5. The flap adjusting system of an aircraft according to claim 1, wherein the at least one load sensor of the at least one adjusting device that is connected to the control and monitoring device is assigned to the at least one adjusting device by a signal line in order to transmit the sensor signals generated by the at least one load sensor, wherein the signal line extends from the at least one load sensor into the at least one regulating flap and from there into a main wing and to the control and monitoring device along one of the at least two bearing devices.

6. The flap adjusting system of an aircraft according to claim 1, wherein at least one of the at least two bearing devices of the at least one regulating flap comprises dropped-hinge kinematics.

7. The flap adjusting system of an aircraft according to claim 1, wherein at least one of the at least two bearing devices of the at least one regulating flap comprises Fowler-kinematics.

8. The flap adjusting system of an aircraft according to claim 1, wherein the control and monitoring device determines that a limiting value that characterizes an operating load has not been reached based on the sensor signals received from the at least one load sensor.

9. The flap adjusting system of an aircraft according to claim 8, wherein the limiting value that characterizes the operating load amounts to less than 60% of a measured value for a maximum operating load.

10. The flap adjusting system of an aircraft according to claim 8, wherein a fixed limiting value that characterizes the operating load is defined in the control and monitoring device.

11. The flap adjusting system of an aircraft according to claim 8, wherein a sensor value that is determined by the at least one load sensor due to a load and needs to be compared with the limiting value that characterizes the operating load is a value that is determined based on an adjusting position of the at least one regulating flap that is respectively assigned.

12. The flap adjusting system of an aircraft according to claim 1, wherein the at least one drive unit is controlled by the control and monitoring device and is mechanically coupled to the at least one adjusting device of each wing by a rotary shaft in order to realize the actuation thereof.

13. The flap adjusting system of an aircraft according to claim 12, wherein the at least one drive unit comprises:
    at least one driving motor and at least one braking device that is assigned to the at least one driving motor in order to stop an output of the respective at least one driving motor, and wherein the control and monitoring device comprises:
    a servo function for generating command signals for the at least one driving motor in order to adjust the at least one regulating flap, and
    a monitoring function, which sends a command signal to the at least one braking device in order to actuate the at least one braking device if the control and monitoring device detects a fault based on a comparison of a sensor value of the at least one load sensor with a limiting value of one of the at least one adjusting device that is respectively assigned to the at least one regulating flap.

14. The flap adjusting system of an aircraft according to claim 1, wherein
    at least two adjusting devices are coupled to the at least one regulating flap of each of the plurality of airfoils and spaced apart from one another in a wingspan direction of the at least one regulating flap, wherein the at least two adjusting devices are respectively coupled to the at least one drive unit that is respectively assigned to the at least one regulating flap by a drive connection, and wherein
    one of the at least one drive unit is respectively assigned to each of the at least one regulating flap, and the at least one drive unit is functionally connected to the control and monitoring device that controls the at least one regulating flap.

15. The flap adjusting system of an aircraft according to claim 14, wherein the at least two adjusting devices of the at least one regulating flap comprise:

at least one driving motor and at least one braking device that is assigned to the at least one driving motor in order to stop an output of the respective at least one driving motor, and wherein the control and monitoring device comprises control and monitoring units, one of which respectively is functionally connected to the at least two adjusting devices that are respectively connected to the at least one regulating flap, wherein each of the control and monitoring units comprises:

a servo function for generating command signals for the at least one driving motor in order to adjust the at least one regulating flap, and a monitoring function, which sends a command signal to the at least one braking device in order to actuate the at least one braking device if the control and monitoring device detects a fault based on a comparison of a sensor value of the at least one load sensor with a nominal value of one of the at least two adjusting devices that are respectively assigned to the at least one regulating flap.

\* \* \* \* \*

UNITED STATES PATENT AND TRADEMARK OFFICE
CERTIFICATE OF CORRECTION

| | | |
|---|---|---|
| PATENT NO. | : 8,746,625 B2 | Page 1 of 1 |
| APPLICATION NO. | : 13/470325 | |
| DATED | : June 10, 2014 | |
| INVENTOR(S) | : Recksiek et al. | |

It is certified that error appears in the above-identified patent and that said Letters Patent is hereby corrected as shown below:

On title page, item 60 Related U.S. Application Data
replace "Provisional application No. 61/260,891, filed on Nov. 13, 2009."
with --Provisional application No. 61/260,890, filed on Nov. 13, 2009--.

Signed and Sealed this
Ninth Day of September, 2014

Michelle K. Lee
*Deputy Director of the United States Patent and Trademark Office*